United States Patent
Fujioka et al.

(10) Patent No.: US 6,485,125 B2
(45) Date of Patent: Nov. 26, 2002

(54) RECORDING METHOD AND RECORDING APPARATUS

(75) Inventors: Satoshi Fujioka, Nagano (JP); Toshihiro Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/910,755

(22) Filed: Jul. 24, 2001

(65) Prior Publication Data

US 2002/0024555 A1 Feb. 28, 2002

(30) Foreign Application Priority Data

Jul. 24, 2000 (JP) .......................... 2000-221965
Jul. 11, 2001 (JP) .......................... 2001-210857

(51) Int. Cl.[7] .............. B41J 2/15; B41J 2/21
(52) U.S. Cl. ............. 347/41; 347/16; 347/43
(58) Field of Search ................ 347/41, 16, 43, 347/15, 12, 40

(56) References Cited

U.S. PATENT DOCUMENTS

| | | | |
|---|---|---|---|
| 4,063,254 A | 12/1977 | Fox et al. | 347/41 |
| 4,198,642 A | 4/1980 | Gamblin | 347/41 |
| 6,250,739 B1 * | 6/2001 | Serra | 347/43 |
| 6,299,283 B1 * | 10/2001 | Kakutani et al. | 347/41 |

FOREIGN PATENT DOCUMENTS

| | | |
|---|---|---|
| EP | 0 679 518 | 11/1995 |
| EP | 0 978 387 | 2/2000 |
| JP | 53-2040 | 1/1978 |
| WO | WO 90/14957 | 12/1990 |

* cited by examiner

Primary Examiner—Lamson Nguyen
(74) Attorney, Agent, or Firm—Oblon, Spivak, McClelland, Maier & Neustadt, P.C.

(57) ABSTRACT

In an n-th primary scanning (forward trip) the rasters by white circle dots are formed. After this primary scanning, printing paper is conveyed toward a secondary-scanning-direction downstream side by the secondary scanning distance which is the same as the interval d between dots, and in the (n+1)-th primary scanning (backward trip) after the conveyance, the rasters by black circle dots are formed. Subsequently, the printing paper is conveyed toward the secondary-scanning-direction downstream side by a secondary scanning distance of (2N−1)·d, and in the (n+2)-th primary scanning (forward trip) after the conveyance and the (n+3)-th primary scanning (forward trip) after the conveyance by a secondary scanning distance d, white circle and black circle dots are formed, respectively. Thus, an image is printed in units of two adjacent rasters formed by the same nozzles.

32 Claims, 5 Drawing Sheets

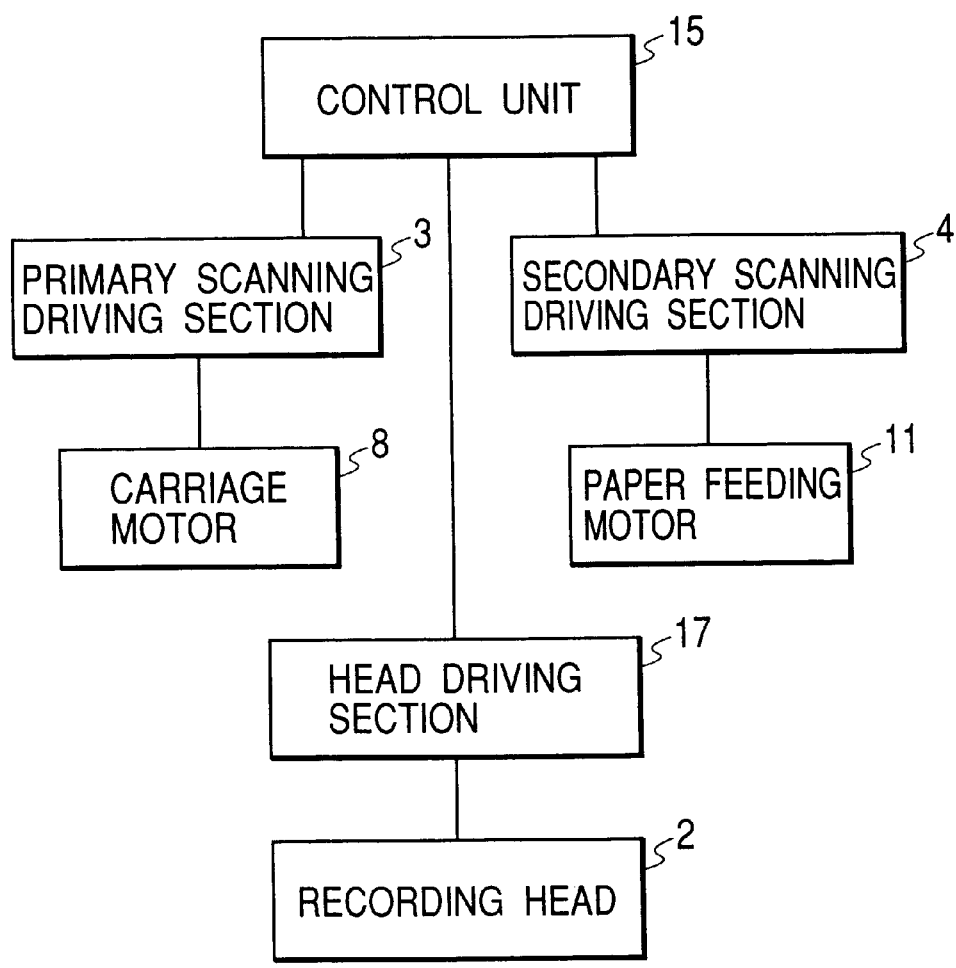

RECORDING METHOD AND RECORDING APPARATUS

BACKGROUND OF THE INVENTION

1. Field of the Invention

The present invention relates to a recording method, and more particularly to the recording method by which while the recording head, having the dot forming element array in which N (N is a positive integer) dot forming elements are aligned at intervals of an even multiple of the distance d between dots in the recording resolution R in the secondary scanning direction which is the direction of conveyance of a recording material, is reciprocally moved in the primary scanning direction perpendicular to the secondary scanning direction, dots are formed on the recording material by the dot forming element array in accordance with recording data, and also the recording material is conveyed in the secondary direction and relatively to the recording head, thus performing recording. Also, the invention relates to a recording apparatus.

The present application is based on Japanese Patent Applications No. 2000-221965 and 2001-210857, which are incorporated herein by reference.

2. Description of the Related Art

In a recording apparatus, e.g., the ink jet printer for performing color printing, the recording head including a plurality of nozzles (dot forming elements) from which ink droplets are ejected, while being reciprocally moved in a primary scanning direction, ejects ink droplets, and also printing paper (a recording material) is conveyed relatively to the recording head and in the secondary scanning direction perpendicular to the primary scanning direction, whereby printing (recording) is performed.

On the recording head, the nozzle (dot forming element) arrays which eject the respective inks of black, dark cyan, light cyan, dark magenta, light magenta, and yellow are disposed in this order in the primary scanning direction.

As the recording method aimed at improving the recording quality of such a color ink jet printer, there is a recording method called the interlacing method described in U.S. Pat. No. 4,198,642 and Unexamined Japanese Patent Publication No. Sho. 53-2040.

In the printing by this "interlacing method", while rasters are formed (i.e. printed) intermittently in the secondary scanning direction, an image is recorded. Then, adjacent rasters are bound to be formed by different nozzles.

However, when the conventional interlacing method is used for the bidirectional printing in which printing is performed on both the forward and backward trips in the primary scanning direction, after a certain raster is formed, the printing paper (recording material) is conveyed in the secondary scanning direction and relatively to the recording head, and thereafter the next raster is formed, whereupon the directions of movement of the recording head in both rasters are reversed to each other. Namely, a certain raster is formed on the forward trip in the primary scanning direction, whereas the next raster is formed on the backward trip in the primary scanning direction.

Therefore, in both rasters, the order of the nozzles from which ink droplets are ejected is reversed. Namely, for example, on the forward trip, ink droplets are ejected in the order of black, dark cyan, light cyan, dark magenta, light magenta, and yellow, whereas on the backward trip, ink droplets are ejected in the reverse order thereto of yellow, light magenta, dark magenta, light cyan, dark cyan, and black. Consequently, in every conveyance unit in the secondary scanning direction, striping (a kind of so-called banding) tends to be visibly generated.

In order to prevent such generation of striping, there is proposed the full-overlap recording method by which a plurality of dots constituting one raster are formed intermittently on each of the forward and backward trips. However, in this recording method, there is a problem that the respective rasters are formed on the forward and backward trips, so that printing speed (throughput) is reduced.

On the other hand, in the ink jet printer in which pigment is used as ink, the dot diameter formed by ink droplets tends to be smaller than that in case of using dye as ink. Consequently, the width (so-called line width) of the raster formed by aligning a plurality of dots in the primary scanning direction also tends to be narrower. Also, each nozzle normally has the deflection (so-called flying curve) peculiar to the nozzle, and ink droplets are not always ejected perpendicularly with respect to the recording head surface on which nozzles are disposed. In this flying curve, there are a flying curve in the secondary scanning direction and a flying curve in the primary scanning direction.

As in the interlacing method, when the adjacent rasters are printed by different nozzles, depending upon the degree of the flying curve in the secondary scanning direction of the nozzles, the gap (i.e. the so-called white stripe in which the ground of printing paper remains unprinted) which is not filled with ink droplets is sometimes produced between both rasters. For example, when a certain raster and the raster adjacent thereto are formed by the nozzles having the flying curves in the directions backing away from each other, the space between both rasters becomes wider than an ideal space, so that a white stripe is generated between both rasters.

Theoretically, if the dot diameter is set to the value (hereinafter referred to as a "theoretical value of dot diameter") obtained by multiplying the interval d between dots by a square root of two, printing can be performed without a white stripe generated. On the other hand, in the actual ink jet printer, since the flying curve in the secondary scanning direction is present, in consideration thereof, the dot diameter is set to the order of twice as large as the interval d between dots, thereby preventing the generation of a white stripe.

In the conventional ink using dye, since the dot diameter becomes in the order of twice as large as the interval d between dots, even if any flying curve in the secondary scanning direction is present, there is no possibility that a white stripe is generated. On the other hand, in the pigment ink, although the dot diameter is larger than the theoretical value of dot diameter, it is smaller than twice the interval d between dots, so that depending upon the degree of the flying curve in the secondary scanning direction, there is a possibility that a white stripe is generated.

SUMMARY OF THE INVENTION

The invention is made in light of these circumstances, and its first object is to provide the recording method and the recording apparatus in which by improving the interlacing method, in the bidirectional recording, no striping is generated, and further, recording is possible at a higher speed than in the conventional full-overlap recording method.

Also, the invention has for its second object the arrangement that even in case the dot diameter becomes smaller as in the pigment ink, a so-called white stripe is not generated.

In order to attain the first object and a portion of the second object, the recording method according to a first aspect of the invention, in the recording method by which, while the recording head, having the dot forming element array in which N (N is a positive integer) dot forming elements are aligned at constant intervals D in the secondary scanning direction which is the direction of conveyance of a recording material, is reciprocally moved in the primary scanning direction perpendicular to the secondary scanning direction, dots are formed on the recording material by the dot forming element array in accordance with recording data, and the recording material is conveyed in the secondary direction and relatively to the recording head, is characterized in that the interval D is the value obtained by multiplying the interval d between dots in the recording resolution in the secondary scanning direction by an even number k, and also the even number k and the dot forming element number N are in prime relation to each other, that there are included a first step of forming dots on the recording material by the dot forming element array while moving the recording head along the forward-trip path in the primary scanning direction, a second step of conveying the recording material in the secondary direction and relatively to the recording head by a secondary scanning distance of the interval d between dots, a third step of forming dots on the recording material by the dot forming element array while moving the recording head along the backward-trip path in the primary scanning direction, and a fourth step of conveying the recording material in the secondary scanning direction and relatively to the recording head by a secondary scanning distance of (2N−1) d, and that the first to fourth steps are repeated, thereby performing recording.

According to the recording method of the first aspect of the invention, by the first step, N rasters are formed on the forward trip in the primary scanning direction, whereafter by the second and third steps, the next N rasters adjacent these N respective rasters are formed on the backward trip in the primary scanning direction. These N rasters formed on the forward trip and the next N rasters formed on the backward trip are formed by the same dot forming elements. Namely, the recording on the recording material is performed in units of two adjacent rasters formed respectively on the forward and backward trips Therefore, the entire image thus recorded is formed in units of these two adjacent rasters, so that in the conventional interlacing method, in case the bidirectional recording is performed, the striping to be generated in every conveyance unit in the secondary scanning direction can be prevented in the entire image.

Also, each raster is formed through the recording on either the forward or backward trip by the same dot forming elements, thus enabling higher-speed printing than in the conventional full-overlap recording method.

Further, between two rasters formed by the same dot forming elements, since the dot forming elements for forming these two rasters are the same, the flying curves in the secondary scanning direction are also made the same. Namely, these two rasters, even if any flying curves in the secondary scanning direction are present, are curved in the same direction. Therefore, if the dot diameter is in the order of the theoretical value of dot diameter, a white stripe is never generated between both rasters. Consequently, even in case the invention is used for the ink jet printer using pigment ink, the generation of a white stripe between dots can be prevented between these two rasters.

The recording method according to a second aspect of the invention, in the recording method by which, while the recording head, having the dot forming element array in which N (N is a positive integer) dot forming elements are aligned at constant intervals D in the secondary scanning direction which is the direction of conveyance of the recording material, is reciprocally moved in the primary scanning direction perpendicular to the secondary scanning direction, dots are formed on the recording material by the dot forming element array in accordance with recording data, and the recording material is conveyed in the secondary direction and relatively to the recording head, is characterized in that the interval D is the value obtained by multiplying the interval d between dots in the recording resolution in the secondary scanning direction by an even number k, and also the even number k and the dot forming element number N are in prime relation to each other, that there are included a first step of forming dots on the recording material by the dot forming element array while moving the recording head along the forward-trip or backward-trip path in the primary scanning direction, a second step of conveying the recording material in the secondary direction and relatively to the recording head by the secondary scanning distance of the interval d between dots, a third step of forming dots on the recording material by the dot forming element array while moving the recording head along the forward-trip or backward-trip path in the primary scanning direction, and a fourth step of conveying the recording material in the secondary scanning direction and relatively to the recording head by a secondary scanning distance of (2N−1)·d, and that the first to fourth steps are repeated, thereby performing recording.

According to the invention, also in a unidirectional recording instead of the bidirectional recording, an image is formed in units of two adjacent rasters. Therefore, between two rasters formed by the same dot forming elements, since the dot forming elements for forming these two rasters are the same, the flying curves in the secondary scanning direction are also made the same. Namely, these two rasters, even if any flying curves in the secondary scanning direction are present, are curved in the same direction. Therefore, if the dot diameter is in the order of the theoretical value of dot diameter, a white stripe is never generated between both rasters. Consequently, even in case the invention is used for the ink jet printer using pigment ink, the generation of a white stripe between dots can be prevented between these two rasters.

The recording method according to a third aspect of the invention, in the recording method according to the first or second aspect, is characterized in that two adjacent rasters formed by the same dot forming elements before and after the secondary scanning distance d relative conveyance are made one unit, and another raster adjacent the rasters constituting one unit is formed by the different dot forming elements from the dot forming elements used for forming the unit raster.

The recording method according to a fourth aspect of the invention, in the recording method according to the first or second aspect, is characterized in that the recording head further has M (M is a positive integer not more than N) auxiliary dot forming element arrays aligned at the intervals D in the secondary scanning direction at the upstream-side end portion or downstream-side end portion in the secondary scanning direction of the N dot forming element arrays, and that the auxiliary dot forming element arrays and the M dot forming element arrays at the downstream-side end portion out of the N dot forming element arrays in case the auxiliary dot forming element arrays are disposed at the upstream-side end portion, and the auxiliary dot forming element arrays and the M dot forming element arrays at the upstream-side end portion out of said N dot forming element arrays in case the auxiliary dot forming element arrays are disposed at the downstream-side end portion, form dots intermittently in proper quantities on the same primary scanning line in both the first step and the third step so that dots are not formed so as to be superposed on each other at the same position, or there is not produced the place in which no dots are formed at the position where dots are to be formed.

According to the recording method of the fourth aspect of the invention, by the secondary scanning distance (2N−1)·d conveyance, the dot forming position of M auxiliary dot forming element arrays and the dot forming position of M out of N dot forming elements arrays come to be overlapped. Both these dot forming element arrays form dots intermittently in proper quantities so that dots are not formed so as to be superposed on each other at the same position, and there is not produced the place in which not dots are formed at the position where dots are to be formed. Therefore, the partial dots in M rasters are formed before the secondary scanning distance (2N−1)·d conveyance, and the remaining dots are formed after the conveyance by the same secondary scanning distance. Thereby, the banding generated every time the recording paper is relatively moved in the secondary scanning direction by the conventional interlacing method can be made inconspicuous, and image quality can be improved.

The recording method according to a fifth aspect of the invention, in the recording method according to the fourth aspect, is characterized in that the M auxiliary dot forming element arrays and M out of the N dot forming element arrays form dots intermittently at a ratio of one to one.

According to the recording method of the fifth aspect of the invention, since the ratio of intermittent dot formation is one to one, the driving control of the recording head can be made simple.

The recording method according to a sixth aspect of the invention, in the recording method according to the first or second aspect, is characterized in that when the offset α of a secondary scanning distance is defined as a greater value than zero, and also as a value not more than the value obtained such that the value obtained by multiplying the interval d by a square root of two is subtracted from the dot diameter formed by the dot forming elements, and the value resulting from the subtraction is divided by a square root of two, the secondary scanning distance in the second step is the distance obtained by adding the offset α to the distance d, and the secondary scanning distance in the fourth step is the distance obtained by subtracting the offset α from the distance (2N−1)·d.

Two adjacent rasters formed by the same dot forming elements, even if any flying curves are present, are curved in the same direction, so that the interval x between both rasters can be set up to the order of the value obtained by dividing the actual dot diameter a by a square root of two. In other words, even if the actual dot diameter a is a theoretical value of dot diameter (=x×a square root of two) with respect to the interval x between both rasters (i.e. the interval between dots), recording becomes possible without a white stripe generated between both rasters.

Therefore, when the maximum value of offset to be added to the interval between rasters is set to α MAX, even if the interval x between both rasters is set to $d < x \leq d + \alpha \text{MAX}$ where $\alpha \text{MAX} = \{(\text{actual dot diameter } a) - \text{interval } d \times (\text{a square root of two})\} \div (\text{a square root of two})$, recording can be performed without a white stripe generated between both rasters.

If the offset α is set to 0<α≦α MAX, according to the recording method of the fourth aspect of the invention, the interval between the rasters formed by the same dot forming elements is set to d+α. Hence, on one hand, a white stripe is not generated between both rasters, and on the other hand, the interval between rasters is widened. Thus, even in case the dot diameter formed by the dot forming elements is relatively small, the width (line width) of the image formed by two adjacent rasters can be made wider.

On the other hand, the distance between rasters after the secondary scanning distance (2N−1)·d movement is made smaller by a. The raster formed before secondary scanning distance {(2N−1)·d−α} movement and the raster adjacent thereto formed after the secondary scanning distance {(2N−1)·d−α} movement are formed by different dot forming elements. Therefore, if the actual dot diameter is less than twice the interval d, a white stripe is possibly generated. However, the secondary scanning distance is made smaller by α, so that even in case the actual dot diameter is less than twice the interval d, the generation of a white stripe between both rasters can be suppressed. Thereby, both between two rasters formed by the same dot forming elements and between two rasters formed by different dot forming elements, the generation of a white stripe is suppressed. Thus, the second object of the invention is achieved.

The recording method according to a seventh aspect of the invention, in the recording method according to the first or second aspect, is characterized in that the secondary scanning distance in the second step is the distance obtained by adding the offset α to the distanced, the secondary scanning distance in the fourth step is the distance obtained by subtracting the offset α from the distance (2N−1)·d, and the offset α of a secondary scanning distance is a greater value than zero, and also is the value at which no white stripe is generated either between the adjacent rasters formed before and after secondary scanning distance (d+α) movement or between the rasters formed before and after the secondary scanning distance {(2N−1)·d−α} movement.

Also according to the invention, the effect similar to that of the sixth aspect of the invention can be obtained.

The recording method according to the invention of an eighth aspect, in the recording method according to the first or second aspect, is characterized in that the recording data for forming dots in the first step and the recording data for forming dots in the third step are the same.

According to the recording method of the eighth aspect of the invention, since the recording data in the first and third steps are the same, the recording data can be reduced to one second. Thereby, the time period required for recording data generation processing is also reduced, and the entire recording can be performed at a high speed.

The recording method according to a ninth aspect of the invention, in the recording method according to the sixth aspect, is characterized in that the recording data for forming dots in the first step and the recording data for forming dots in the third step are the same.

The recording apparatus according to a tenth aspect of the invention, in the recording apparatus which includes the recording head having the dot forming element array in which N (N is a positive integer) dot forming elements are aligned at constant intervals D in the secondary scanning direction which is the direction of conveyance of the recording material, the head driving means for driving the dot forming elements, the primary scanning driving means for reciprocally moving the recording head in the primary scanning direction perpendicular to the secondary scanning direction with respect to said recording material, the secondary scanning driving means for conveying the recording material in the secondary scanning direction and relatively to the recording head, the control means for controlling the head driving means, the primary scanning driving means, and the secondary scanning driving means, and performs recording while the recording head scans the surface of the recording material in the primary scanning direction and the secondary scanning direction, is characterized in that the interval D is the value obtained by multiplying the interval d between dots in the recording resolution in the secondary scanning direction by an even number k, and also the even number k and the dot forming element number N are in prime relation to each other, and that recording is performed by such repetition that the control means controls the primary scanning driving means and the head driving means to form dots on the recording material by the dot forming element array while moving the recording head along the forward-trip path in the primary scanning direction, controls the secondary scanning driving means to convey the recording material in the secondary direction and relatively to the recording head by a secondary scanning distance of the interval d between dots, controls the primary scanning driving means and the head driving means to form dots on the recording material by the dot forming element array while moving the recording head along the backward-trip path in the primary scanning direction, and controls the secondary scanning driving means to convey the recording material in the secondary scanning direction and relatively to the recording head by a secondary scanning distance of $(2N-1)\cdot d$.

According to the recording apparatus of the tenth aspect of the invention, the effect similar to that of the first aspect of the invention can be obtained.

The recording apparatus according to an eleventh aspect of the invention, in the recording apparatus which includes the recording head having the dot forming element array in which N (N is a positive integer) dot forming elements are aligned at constant intervals D in the secondary scanning direction which is the direction of conveyance of the recording material, the head driving means for driving the dot forming elements, the primary scanning driving means for reciprocally moving the recording head in the primary scanning direction perpendicular to the secondary scanning direction with respect to the recording material, the secondary scanning driving means for conveying the recording material in the secondary scanning direction and relatively to the recording head, the control means for controlling the head driving means, the primary scanning driving means, and the secondary scanning driving means, and performs recording while the recording head scans the surface of the recording material in the primary scanning direction and the secondary scanning direction, is characterized in that the interval D is the value obtained by multiplying the interval d between dots in the recording resolution in the secondary scanning direction by an even number k, and also the even number k and the dot forming element number N are in prime relation to each other, and that recording is performed by such repetition that the control means controls the primary scanning driving means and the head driving means to form dots on the recording material by the dot forming element array while moving the recording head along the forward-trip or backward-trip path in the primary scanning direction, controls the secondary scanning driving means to convey the recording material in the secondary direction and relatively to the recording head by a secondary scanning distance of the interval d between dots, controls the primary scanning driving means and the head driving means to form dots on the recording material by the dot forming element array while moving the recording head along the forward-trip or backward-trip path in the primary scanning direction, and controls the secondary scanning driving means to convey the recording material in, the secondary scanning direction and relatively to the recording head by a secondary scanning distance of $(2N-1)\cdot d$.

The recording apparatus according to a twelfth aspect of the invention, in the recording apparatus according to the tenth or eleventh aspect, is characterized by being arranged that two adjacent rasters formed by the same dot forming elements before and after the secondary scanning distance d relative conveyance are made one unit, and another raster adjacent the rasters constituting one unit is formed by the different dot forming elements from the dot forming elements used for forming the unit raster.

The recording apparatus according to a thirteen aspect of the invention, in the recording apparatus according to the tenth or eleventh aspect, is characterized by being arranged that the recording head further has M (M is a positive integer not more than N) auxiliary dot forming element arrays aligned at the intervals D in the secondary scanning direction at the upstream-side end portion or downstream-side end portion in the secondary scanning direction of the N dot forming element arrays, and that the auxiliary dot forming element arrays and the M dot forming element arrays at the downstream-side end portion out of the N dot forming element arrays in case the auxiliary dot forming element arrays are disposed at the upstream-side end portion, and the auxiliary dot forming element arrays and the M dot forming element arrays at the uptream-side end portion out of the N dot forming element arrays in case the auxiliary dot forming element arrays are disposed at the downstream-side end portion, form dots intermittently in proper quantities on the same primary scanning line by the control means in both the first step and the third step so that dots are not formed so as to be superposed on each other at the same position, or there is not produced the place in which no dots are formed at the position where dots are to be formed.

The recording apparatus according to a fourteenth aspect of the invention, in the recording apparatus according to the thirteenth aspect, is characterized by being arranged that the M auxiliary dot forming element arrays and M out of the N dot forming element arrays form dots intermittently at a ratio of one to one.

The recording apparatus according to a fifteenth aspect of the invention, in the recording apparatus according to the tenth or eleventh aspect, is characterized in that when the offset a of a secondary scanning distance is defined as a greater value than zero, and also as a value not more than the value obtained such that the value obtained by multiplying the interval d by a square root of two is subtracted from the dot diameter formed by the dot forming elements, and the value resulting from the subtraction is divided by a square root of two, the control means is arranged such that the secondary scanning distance in the second step is the distance obtained by adding the offset $\alpha$ to the distance d, and the secondary scanning distance in the fourth step is the distance obtained by subtracting the offset $\alpha$ from the distance $(2N-1)\cdot d$.

The recording apparatus according to a sixteenth aspect of the invention, in the recording apparatus according to the tenth or eleventh aspect, is characterized by being arranged that the secondary scanning distance in the second step is the distance obtained by adding the offset $\alpha$ to the distance d, the secondary scanning distance in the fourth step is the distance obtained by subtracting the offset α from the distance (2N−1)·d, and the offset a of a secondary scanning distance is a greater value than zero, and also is the value at which no white stripe is generated either between the adjacent rasters formed before and after the secondary scanning distance (d+α) movement or between the rasters formed before and after the secondary scanning distance {(2N−1)·d−α} movement.

The recording apparatus according to the invention of a seventeenth aspect, in the recording apparatus according to the tenth or eleventh aspect, is characterized in that the control means is set or can be set such that the recording data for forming dots in the first step and the recording data for forming dots in the third step are the same.

The recording apparatus according to an eighteenth aspect of the invention, in the recording apparatus according to the fifteenth aspect, is characterized in that the control means is set or can be set such that the recording data for forming dots in the first step and the recording data for forming dots in the third step are the same.

Features and advantages of the invention will be evident from the following detailed description of the preferred embodiments described in conjunction with the attached drawings.

BRIEF DESCRIPTION OF THE DRAWINGS

In the accompanying drawings;

FIG. 5 shows a block flow diagram of the outline of the "recording apparatus" according to the invention.

DETAILED DESCRIPTION OF THE PREFERRED EMBODIMENTS

<Arrangement of Color Ink Jet Printer 1>

Figure 1:
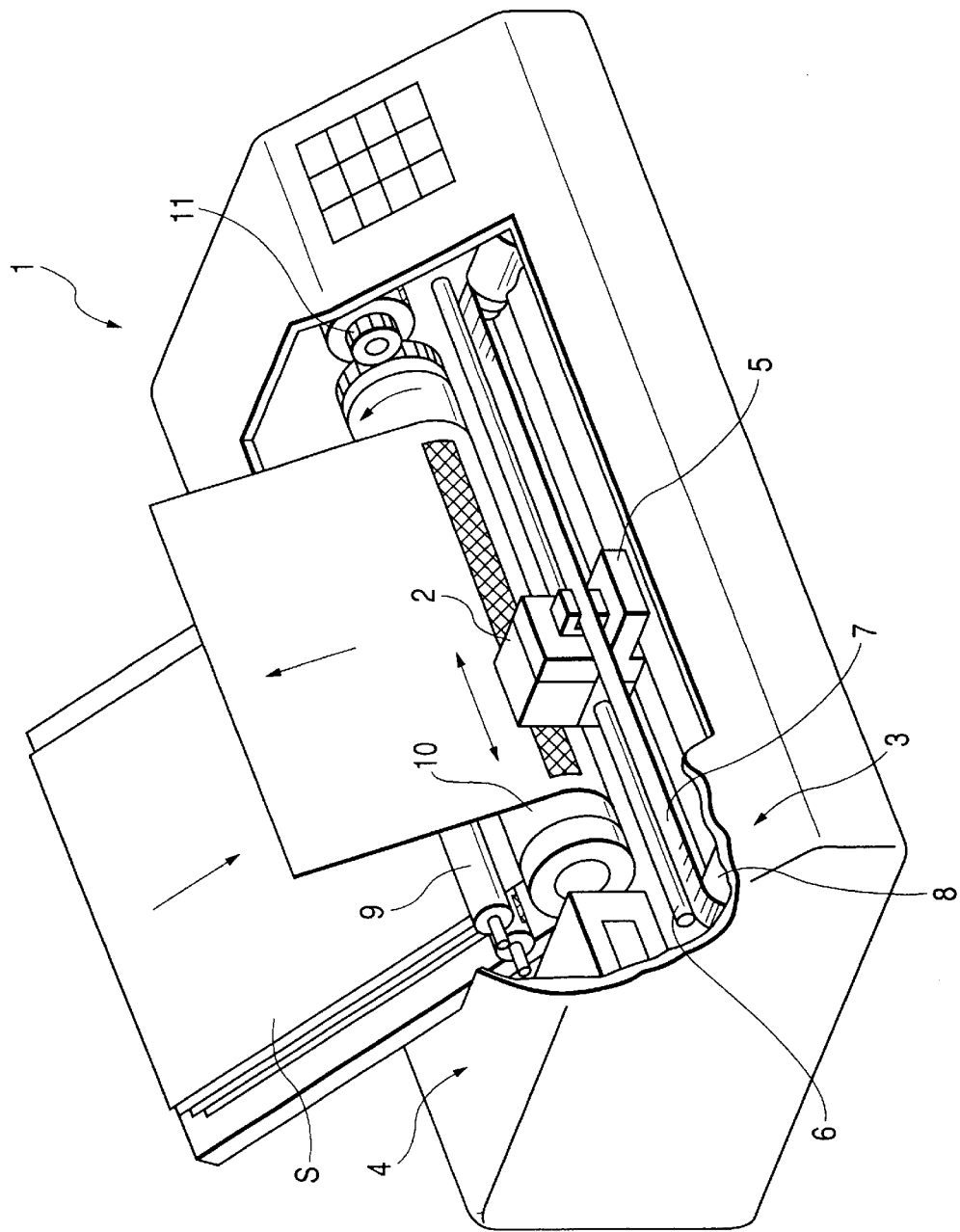
FIG. 1 shows a perspective view (partially sectional view) of the color ink jet printer as an example of the "recording apparatus" according to the invention.

FIG. 1 is a perspective view (partially sectional view) of the color ink jet printer 1 as an example of the "recording apparatus" according to the invention. This color ink jet printer (hereinafter referred to simply as a "printer") 1 includes the recording head 2 for performing printing (recording) on the printing paper S as an example of the "recording material", the primary scanning driving section 3 as the "primary scanning driving means", and the secondary scanning driving section 4 as the "secondary scanning driving means".

Figure 2A:
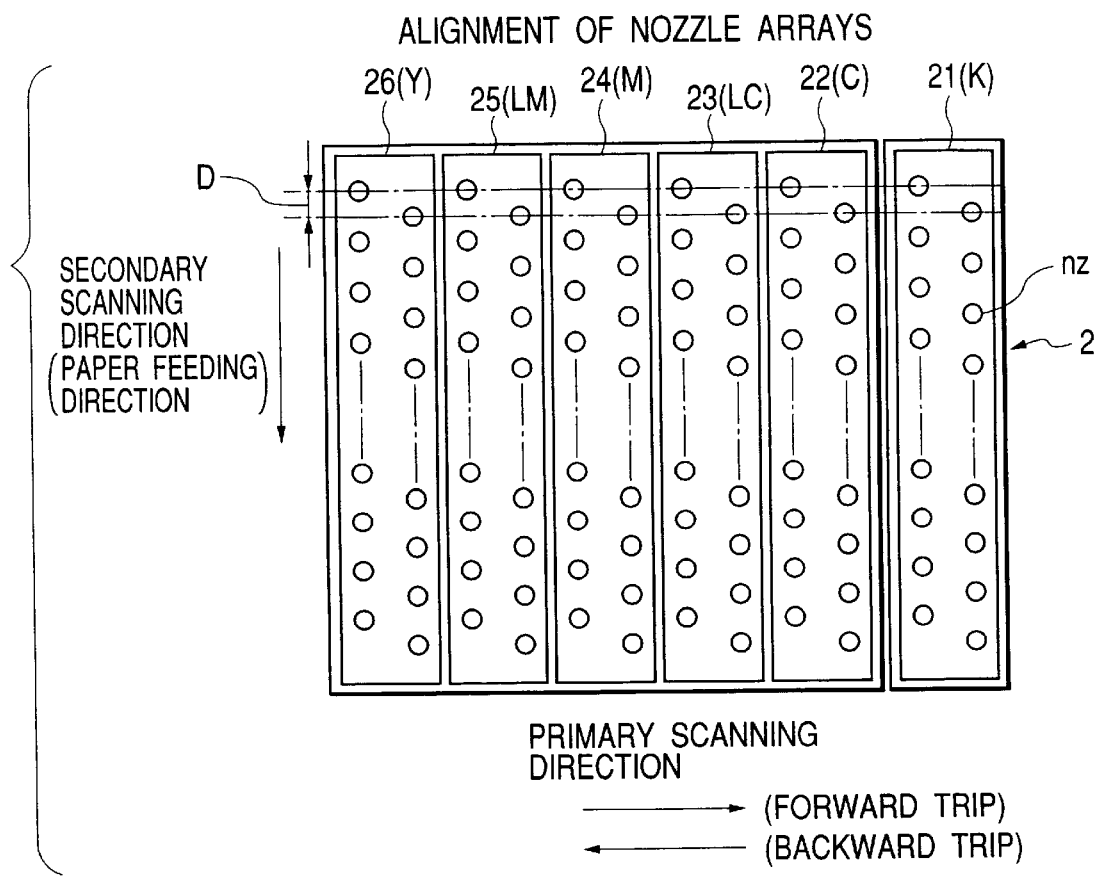
FIG. 2A shows a schematic diagram showing the alignment or the ink jet nozzles as an example of the "dot forming elements" formed on the surface of a recording head opposite to the printing paper.

On the surface of the recording head 2 (hereinafter referred to as a "head surface") opposite to the printing paper S, the ink jet nozzles (hereinafter referred to as "nozzles") as an example of the "dot forming elements" are formed. FIG. 2A is a schematic diagram showing the alignment of the nozzles formed on the head surface of the recording head 2. The recording head 2 includes six sets of nozzle arrays 21 to 26 for six color inks. The six sets of nozzle arrays 21 to 26 eject black (K), dark cyan (C), light cyan (LC), dark magenta (M), light magenta (LM), and yellow (Y) ink droplets, respctively.

The six sets of nozzle arrays 21 to 26 include a plurality of (64 in this embodiment) nozzles nz staggeringly aligned at constant nozzle intervals D along the secondary scanning direction, respectively. The nozzle interval D is set to a positive integer k times (particularly an even multiple in this embodiment) the interval d between dots in the recording resolution R in the secondary scanning direction. This positive integer (even number) k is called a "nozzle pitch". In this embodiment, the recording resolution R in the secondary scanning direction is 720 [DPI], and the nozzle pitch k is set to k=4. Therefore, the interval d (which is also the interval between rasters) between dots in the secondary scanning direction is d about 35.3 [μm], and the nozzle interval D=k×d=about 141.1 [μm].

Further, a plurality of nozzles nz included in each nozzle array are not necessarily staggeringly aligned, and may be linearly aligned. However, the staggering alignment yields an advantage that the nozzle pitch k is easily set to a small value.

Figure 2B:
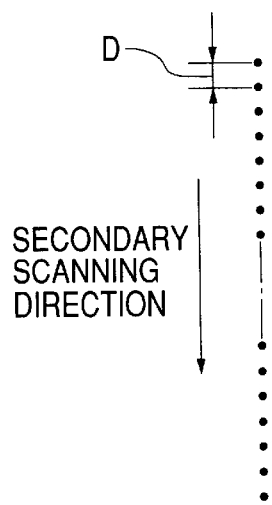
FIG. 2B shows the alignment of a plurality of dots formed by one nozzle array.

FIG. 2B shows the alignment of a plurality of dots formed by one nozzle array. One nozzle array, regardless of whether its alignment is staggering or linear, is driven so that the dots to be formed are aligned in substantially a straight line along the secondary scanning direction. Further, as described later, in the plurality of nozzles disposed in each of the nozzle arrays 21 to 26, the entire number thereof is not always used, and only a portion thereof is sometimes used.

Each nozzle of these nozzle arrays 21 to 26, as shown in FIG. 5, is driven by the head driving section 17 as the "head driving means" under the control of the control unit 15 as the "control means", and ink droplets are ejected from the nozzles of the recording head 2, thus printing on the printing paper S. In this embodiment, pigment is used as ink, and the dot diameter (actual dot diameter) a formed by the ink droplets ejected from each nozzle is about 60 [μm]. Therefore, the dot diameter a is about 1.7 times the interval d between dots (the interval between rasters), and does not reach twice.

Back in FIG. 1, the primary scanning driving section 3 includes the carriage 5 for fixing the recording head 2, a guide rail 6, an endless belt 7, and a carriage motor (e.g. a stepping motor, a DC motor, etc.) 8. The rotation and stop of the carriage motor 8 is controlled by the aforesaid control unit 15. This control unit 15 rotates the carriage motor 8, whereby the carriage 5 is guided by the guide rail 6 via the endless belt 7, and reciprocally moved in the primary scanning direction.

The secondary scanning driving section 4 includes a roller pair 9, a roller 10, and a paper feeding motor (e.g. a stepping motor, a DC motor, etc.) 11. The rotation and stop of the paper feeding motor 11 is controlled by the aforesaid control unit 15. This control unit 15 rotates the paper feeding motor 11, whereby the printing paper S is dragged in by the roller pair 9, and conveyed in the secondary scanning direction via the roller 10.

Namely, as shown in FIG. 5, the control unit 15 controls the primary scanning driving section 3, the secondary scanning driving section 4, and the head driving section 17, and prints on the printing paper S by the recording method to be described later.

<First Recording Method>

Figure 3:
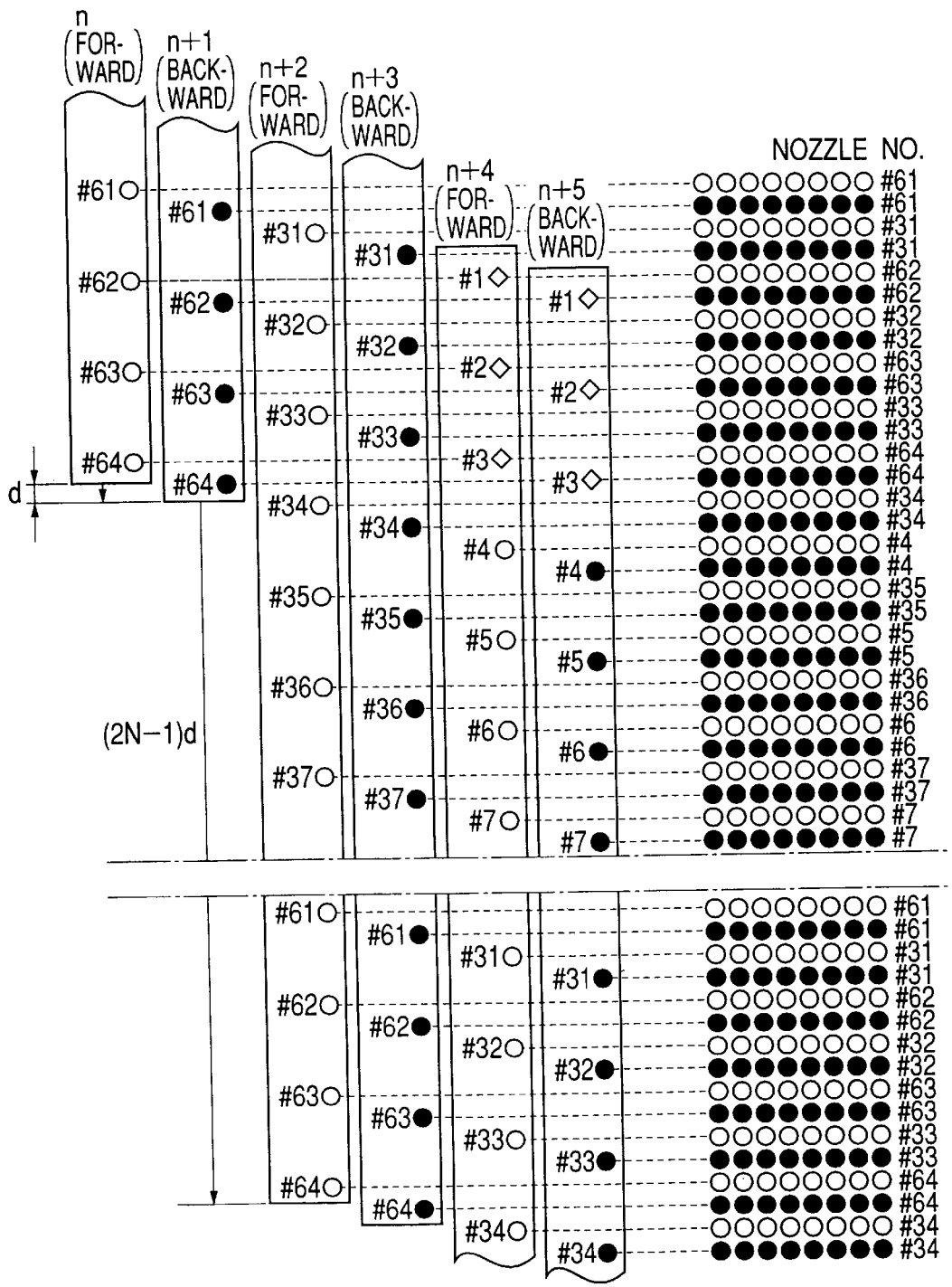
FIG. 3 shows a schematic diagram showing the dot formation by a first recording method in a printer.

FIG. 3 is a schematic diagram showing the dot formation by the first recording method in the printer 1. In the first recording method, out of 64 nozzles respectively disposed in the individual nozzle arrays 21 to 26, three nozzles #1 to #3 positioned on the secondary-scanning-direction upstream side (up in FIG. 3) are not used, but only 61 nozzles #4 to #64 are used. Namely, the nozzle number N=61. Further, the nozzle number N and the nozzle pitch k need be in prime relation to each other, and since N=61 and k=4, this condition is fulfilled.

In FIG. 3, the #1 to #3 nonuse nozzles are indicated by a white rhombus, and the #4 to #64 use nozzles and the dots formed by these use nozzles are indicated by a white circle or a black circle.

FIG. 3 shows the dot formation (i.e. raster formation) in six primary scannings of from the n-th scanning after the start of printing to the (n+5)-th primary scanning. Out of these primary scannings, the n-th, the (n+2)-th, and the (n+4)-th primary scannings are the forward-trip scannings, whereas the (n+1)-th, the (n+3)-th, and the (n+5)-th primary scannings are the backward-trip scannings. The dots formed by the primary scanning on the forward trip are indicated by the white circle, and the dots formed by the primary scanning on the backward trip are indicated by the black circle, respectively.

Further, in FIG. 3, each raster is represented as 8 dots. However, in the actual printing, the number of dots varies depending on each raster, and more dots than this number or less dots than this number are sometimes formed. Also, dots are formed only at the positions where dots are to be formed, and no dots are formed at any other position. The case is also the same in FIG. 4 to be described later.

In the n-th forward-trip primary scanning, the rasters by the white circle dots are formed by the #4 to #64 nozzles. FIG. 3 shows only the raster formation by the #61 to #464 nozzles out thereof After the n-th primary scanning, the printing paper S is conveyed toward the secondary-scanning-direction downstream side by a secondary scanning distance of 1/720 [inch]=about 35.3 [μm) which is the same as the interval d between dots. FIG. 3 shows it not as the conveyance of the printing paper S, but as the movement of the recording head 2.

After the conveyance, in the (n+1)-th backward-trip primary scanning, the rasters by the black circle dots are formed by the #4 to #61 nozzles. FIG. 3 shows only the raster formation by the #61 to #64 nozzles out thereof. Thus, two adjacent rasters are formed by the forward-trip and backward-trip primary scannings of the same nozzles.

Subsequently, the printing paper S is conveyed toward the secondary-scanning-direction downstream side by a secondary scanning distance of (2N−1)·d=(2×61−1)×1/720 [inch]= about 4.27 [mm]. Since this secondary scanning distance is equivalent to 2N−1=121 [dots], the #31 nozzle is positioned toward the secondary-scanning-direction upstream side (down in FIG. 3) by one dot of the #61 nozzle in the (n+1)-th scanning.

After the conveyance, the (n+2)-th forward-trip primary scanning is performed. In this primary scanning, the rasters by the white circle dots are formed by the #4 to #64 nozzles. FIG. 3 shows only the raster formation by the #31 to #37 nozzles and the #61 to #64 nozzles out thereof. By this primary scanning, for example, the #31 nozzle forms the raster by the white circle dots at the position adjacent the raster formed by the #61 nozzle, the #32 nozzle at the position adjacent the raster formed by the #62 nozzle, the #33 nozzle at the position adjacent the raster formed by the #63 nozzle, and the#34 nozzle at the position adjacent the raster formed by the #64 nozzle, respectively.

Subsequently, the printing paper S is conveyed toward the secondary-scanning-direction downstream side by a secondary scanning distance of 1/720 [inch]=about 35.3 [μm] which is the same as the interval d between dots. After the conveyance, the black circle dots by the #4 to #64 nozzles are formed by the (n+3)-th backward-trip primary scanning. Thereby, two adjacent rasters formed respectively through the forward and backward trips are formed by the same nozzles.

Again, the printing paper S is conveyed toward the secondary-scanning-direction downstream side by a secondary scanning distance of (2N−1)·d=(2×61−1)×1/720 [inch]= about 4.27 [mm], and two adjacent rasters are formed by the same nozzles through the (n+4)-th forward-trip primary scanning and the (n+5)-th backward-trip primary scanning.

Thus, while the secondary scanning distanced and (2N−1) d conveyances being alternately repeated, an image is recorded in units of two rasters to be formed by the same nozzles. Therefore, since the recorded entire image is formed in units of these two adjacent rasters, in the conventional interlacing method, in case the bidirectional printing is performed, the striping generated in every conveyance unit in the secondary scanning direction can be prevented in the entire image.

Also, each raster is formed through the printing on either the forward or backward trip by the same nozzle, thus enabling higher-speed printing than in the full-overlap recording method.

Further, in two rasters formed by the same nozzles, since the nozzles forming these two rasters are the same, the flying curves in the secondary scanning direction are also made the same. Namely, these two rasters, even if any flying curves in the secondary scanning direction are present, are curved in the same direction. Therefore, if the dot diameter a is in the order of the theoretical value of dot diameter (i.e. a square root of two times the interval d between dots in the record resolution in the secondary scanning direction), a white stripe is never generated between rasters. Here, in this embodiment, as described above, the dot diameter a=about 60 [μm], which does not reach about 70 [μm] which is about twice the interval d between dots as in the dye ink, but covers not less than the theoretical value of dot diameter A (A=about 9.8 [μm]). Therefore, a white stripe is never generated between two rasters formed by the same nozzles.

Two rasters formed by the same nozzles may be arranged such as to be printed using the same recording data, and may also be arranged such as to be printed using the different recording data corresponding to each raster. In case of printing using the same recording data, even in the printing with a recording resolution of 720 [DPI] in the secondary scanning direction, the recording data amount can be set to substantially the amount equivalent to 360 [DPI], that is, one second of the recording data in the 720 [DPT] printing. Thereby, the recording data amount can be reduced. Also, since the time period required for recording data generation is reduced, high-speed printing also becomes possible.

<Second Recording Method>

Figure 4:
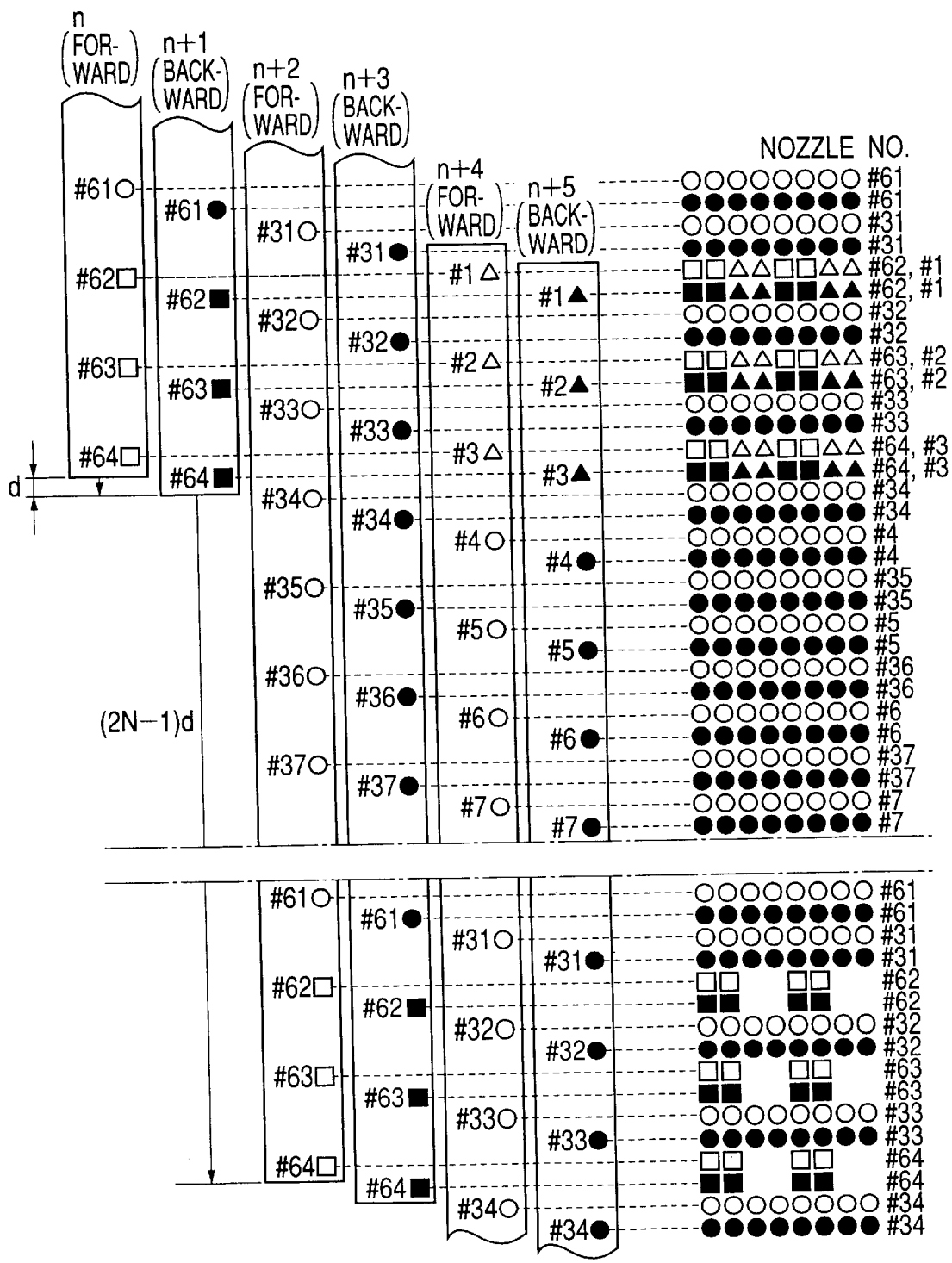
FIG. 4 shows a schematic diagram showing the dot formation by a second recording method in the printer.

FIG. 4 is a schematic diagram showing the dot formation by the second recording method in the printer 1. Out of 64 nozzles respectively disposed in the individual nozzle arrays 21 to 26, in addition to 61 (N=61) use nozzles #4 to 464, three (M=3) nozzles #1 to #3 are used as auxiliary nozzles. Also, out of the #4 to #64 use nozzles, the #62 to #64 nozzles, which are positioned on the opposite side (i.e. the upstream side in the direction of conveyance) to the auxiliary nozzles and which are of the same number (M=3) as that of the auxiliary nozzles, are used as the nozzles which form dots intermittently at the positions where dots are to be formed. The other #4 to #61 nozzles are used as the nozzles which always form dots at the positions where dots are to be formed. Hereinafter, the former are called "intermittent nozzles", and the latter "constant-use nozzles".

Further, the use nozzle number N and the nozzle pitch k need be in prime relation to each other, and since N=61 and k=4, this condition is fulfilled.

The intermittent nozzles (#62 to #64 nozzles) and the auxiliary nozzles (#1 to #3 nozzles), as described later, are disposed on the same primary scanning line (i.e. the same raster) Both kinds of nozzles are controlled by the control unit and the head driving section so that dots are intermittently formed in proper quantities on the same primary scanning line such that dots are not formed so as to be superposed on each other at the same position, or there is not produced the place in which no dots are formed at the position where dots are to be formed.

In FIG. 4, the auxiliary nozzles (#1 to #3 nozzles) and the dots formed by these auxiliary nozzles are indicated by a white triangle or a black triangle, the constant-use nozzles (#4 to #61 nozzles) and the dots formed by these constant-use nozzles by a white circle or a black circle, and the intermittent nozzles (#62 to #64 nozzles) and the dots formed by these intermittent nozzles by a white square or a black square, respectively.

FIG. 4 shows the dot formation (i.e. raster formation) in six primary scannings of from the n-th scanning after the start of printing to the (n+5)-th primary scanning. Out of these primary scannings, the n-th, the (n+2)-th, and the (n+4)-th primary scannings are the forward-trip scannings, whereas the (n+1)-th, the (n+3)-th, and the (n+5)-th primary scannings are the backward-trip scannings. The dots formed by the primary scanning on the forward trip are indicated by the white circle, the white square, or the white triangle, and the dots formed by the primary scanning on the backward trip are indicated by the black circle, the black square, or the black triangle, respectively.

In the n-th forward-trip primary scanning, the rasters by the white circle dots are formed by the constant-use nozzles (out of which FIG. 4 shows only the raster formation by the #61 nozzle), and the white square and white triangle dots are formed every two dots by the intermittent nozzles (#62 to #64 nozzles) and the auxiliary nozzles (#1 to #3 nozzles), respectively (in the n-th primary scanning of FIG. 4, the auxiliary nozzles (#1 to #3 nozzles) and the dots formed thereby are omitted).

In this embodiment, the intermittent nozzles (#62 to #64 nozzles) are controlled to form dots in the first and second, and the fifth and sixth dot formation places from the right in one raster, and the auxiliary nozzles (#1 to #3 nozzles) are controlled to form dots in the third and fourth, and the seventh and eighth dot formation places in which the intermittent nozzles (#62 to #64 nozzles) have not formed dots in the same one raster. Therefore, the intermittent nozzles (#62 to #64 nozzles) and the auxiliary nozzles (#1 to #3 nozzles) form dots in conjunction, whereby one raster is formed.

After the n-th primary scanning, in the same manner as the aforesaid first recording method, the printing paper S is conveyed toward the secondary-scanning-direction downstream side by a secondary scanning distance of $1/720$ [inch]= about 35.3 [$\mu$m] which is the same as the interval d between dots.

After the conveyance, in the (n+1)-th backward-trip primary scanning, the rasters by the black circle dots are formed by the constant-use nozzles (#4 to #61 nozzles), and also the black square and black triangle dots are formed every two dots by the intermittent nozzles (#62 to #64 nozzles) and the auxiliary nozzles (#1 to #3 nozzles), respectively. Thus, two adjacent rasters are formed by the forward-trip and backward-trip primary scannings of the same nozzles.

Subsequently, the printing paper S is conveyed toward the secondary-scanning-direction downstream side by a secondary scanning distance of $(2N-1) \cdot d = (2 \times 61-1) \times 1/720$ [inch] about 4.27 [$\mu$m]. Since this secondary scanning distance is equivalent to 2N-1=121 [dots], the #31 nozzle is positioned toward the secondary-scanning-direction upstream side (down in FIG. 4) by one dot of the #61 nozzle in the (n+1)-th scanning.

After the conveyance, the (n+2)-th forward-trip primary scanning is performed. In this primary scanning, similarly to the n-th primary scanning, the rasters by the white circle dots are formed by the constant-use nozzles (#4 to #61 nozzles), and also the white square and white triangle dots are formed every two dots by the intermittent nozzles (#62 to #64 nozzles) and the auxiliary nozzles (#1 to #3 nozzles), respectively. By this primary scanning, for example, the #31 nozzle forms the raster by the white circle dots at the position adjacent the raster formed by the #61 nozzle, the #32 nozzle at the position adjacent the raster formed by the #62 nozzle, the #33 nozzle at the position adjacent the raster formed by the #63 nozzle, and the #34 nozzle at the position adjacent the raster formed by the #64 nozzle, respectively.

Subsequently, the printing paper S is conveyed toward the secondary-scanning-direction downstream side by a secondary scanning distance of $1/720$ [inch]=about 35.3 [$\mu$m] which is the same as the interval d between dots. After the conveyance, dots are formed by the (n+3)-th backward-trip scanning. Thereby, two adjacent rasters formed respectively through the forward and backward trips are formed by the same nozzles.

Again, the printing paper S is conveyed toward the secondary-scanning-direction downstream side by a secondary scanning distance of $(2N-1) \cdot d = (2 \times 61-1) \times 1/720$ [inch]= about 4.27 mm], and two adjacent rasters are formed by the same nozzles through the (n+4)-th forward-trip primary scanning and the (n+5)-th backward-trip primary scanning. Further, in the (n+4)-th primary scanning and the (n+5)-th primary scanning, the blank portion between the dots (white square and black square) formed by the intermittent nozzles (#62 to #64 nozzles) is filled by the auxiliary nozzles (#1 to #3 nozzles) through not shown (n+6)-th and (n+7)-th scannings.

Thus, while the secondary scanning distanced and (2N-1)·d conveyances being alternately repeated, an image is recorded in units of two rasters to be formed by the same nozzles. Therefore, the effect similar to that of the aforesaid first recording method can be obtained.

Further, according to this second recording method, in very secondary-scanning-distance (2N-1)·d secondary scanning, he auxiliary nozzles (#1 to #3 nozzles) and the intermittent nozzles (#62 to #64 nozzles) form dots intermittently. Hence, the partial dots in six (3×2) rasters are formed before the secondary scanning distance of (2N-1)·d conveyance, and the remaining dots are formed after the same secondary scanning distance conveyance. Thereby, the banding generated every time the recording paper is relatively moved in the secondary scanning direction by the conventional interlacing method can be made inconspicuous, and image quality can be improved.

Also in the second recording method, similarly to the first recording method, two rasters formed by the same nozzles can be arranged to be printed using the same recording data, and can also be arranged to be printed using the different recording data corresponding to each raster.

<Third Recording Method>

In the third recording method, in the aforesaid first and second recording methods, the secondary scanning distance d is set to (d+α) obtained by adding the offset α to this distance d, whereas the secondary scanning distance (2N−1)·d is set to $$\{(2N-1)\cdot d-\alpha\}$$

where $$d<\alpha \leq \alpha MAX$$

ti αMAX={(actual dot diameter $a$)−interval $d$×(a square root of two)}÷(a square root of two)

Namely, the conveyance in the secondary scanning direction performed between the n-th primary scanning and the (n+1)-th primary scanning, the conveyance in the secondary scanning direction performed between the (n+2)-th primary scanning and the (n+3)-th primary scanning, and further the conveyance in the secondary scanning direction performed between the (n+4)-th primary scanning and the (n+5)-th primary scanning are all performed by a secondary scanning distance of (d+α). On the other hand, the conveyance in the secondary scanning direction performed between the (n+1)-th primary scanning and the (n+2)-th primary scanning, and the conveyance in the secondary scanning direction performed between the (n+3)-th primary scanning and the (n+4)-th primary scanning are both performed by a secondary scanning distance of {(2N−1)·d−α}. Thus, the secondary scanning distance (d+α) conveyance and the secondary scanning distance {(2N−1)·d−α} conveyance are alternately repeated.

In this embodiment, since the dot diameter a=about 60 [μm] and the interval d=about 35.3 [μm], α MAX=about 7 [μm]. Therefore, as offset α, the positive integer (e.g. 3 [μm]) not more than 7 [μm] can be selected.

Even if the secondary scanning distance d is set to (d+α), printing can be performed without a white stripe generated between both rasters. This is for the following reason.

Two adjacent rasters formed by the same dot forming elements, even if any flying curves are present, are curved in the same direction, so that the interval x between both rasters can be set up to the order of the value obtained by dividing the actual dot diameter a by a square root of two. In other words, even if the actual dot diameter a is a theoretical value of dot diameter (=x×a square root of two) with respect to the interval x between both rasters (i.e. the interval between dots), recording becomes possible without a white stripe generated between both rasters. Therefore, when the maximum value of offset α to be added to the interval between rasters is set to α MAX, even if the interval x between both rasters is set to $$d<x \leq d+\alpha MAX,$$

recording can be performed without a white stripe generated between both rasters.

Also, since the interval between rasters is widened without a white stripe generated therebetween, even in case the dot diameter of the ink droplets formed by the nozzles is relatively small, the width (line width) of the image formed by two adjacent rasters can be made wider.

On the other hand, the distance between rasters after the secondary scanning distance of (2N−1)·d movement is made smaller by α. Since these rasters are formed by different nozzles, if the actual dot diameter d is less than twice the interval d, a white stripe is possibly generated. However, the secondary scanning distance is made smaller by α, so that the generation of a white stripe can be suppressed also between both rasters.

Thereby, both between two rasters formed by the same nozzles and between two rasters formed by different nozzles, the generation of a white stripe is suppressed.

Further, a specific value of α is preferably obtained by experiment etc. with every recording apparatus so that a white stripe is not generated both between the adjacent rasters formed before and after the secondary scanning distance (d+α) movement and between the adjacent rasters formed before and after the secondary scanning distance {(2N−1)·d−α} movement.

<Another Embodiment>

In the aforesaid embodiment, the nozzle pitch k is set to k=2. Alternatively, it can also be set to another value such as k=6, 8, etc.

Also, the aforesaid first to third recording methods can also be realized by a hardware circuit, and can also be realized as a CUP and the software program executed by the CUP.

Further, in the aforesaid embodiment, the intermittent nozzles and the auxiliary nozzles both form dots in units of two dots. Alternatively, both can also form dots in units of one dot, and further in units of three or more dots. Also, the intermittent nozzles and the auxiliary nozzles form dots at a ratio of one to one on the same primary scanning line. Additionally, both can also form dots at a different ratio such as two to one, one to two, three to one, etc.

Furthermore, in the aforesaid embodiment, the intermittent nozzles and the auxiliary nozzles are each set to be three (M=3) in numbers Alternatively, each can also take another number such as two (M=2) etc.

According to the invention, in the conventional interlacing method, in case the bidirectional recording is performed, the striping generated in every conveyance unit in the secondary scanning direction can be prevented in the entire image. Also, the higher-speed printing than in the conventional full-overlap recording method becomes possible. Further, the generation of a white stripe between dots can be prevented.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A recording method in which, while a recording head, having a dot forming element array in which N dot forming elements are aligned at constant intervals D in a secondary scanning direction which is a direction of conveyance of a recording material, is reciprocally moved in a primary scanning direction perpendicular to said secondary scanning direction, dots are formed on said recording material by said dot forming element array in accordance with recording data, and said recording material is conveyed in said secondary direction and relatively to said recording head, wherein said N is a positive integer and said interval D is a value obtained by multiplying an interval d between dots in recording resolution in said secondary scanning direction by an even number k, and also said even number k and said dot forming element number N are in prime relation to each other, said recording method comprising steps of:

a first step of forming dots on said recording material by said dot forming element array while moving said recording head along a forward-trip path in said primary scanning direction;

a second step of conveying said recording material in said secondary direction and relatively to said recording head by a secondary scanning distance of said interval d between dots;

a third step of forming dots on said recording material by said dot forming element array while moving said recording head along a backward-trip path in said primary scanning direction; and a fourth step of conveying said recording material in said secondary scanning direction and relatively to said recording head by a secondary scanning distance of $(2N-1)\cdot d$;

wherein said first to fourth steps are repeated, thereby performing recording.

2. A recording method according to claim 1, wherein two adjacent rasters formed by same dot forming elements before and after said secondary scanning distance d relative conveyance are made one unit, and another raster adjacent said rasters constituting one unit is formed by different dot forming elements from dot forming elements used for forming said unit raster.

3. A recording method according to claim 1, wherein said recording head further has M auxiliary dot forming element arrays aligned at said intervals D in said secondary scanning direction at an upstream-side end portion or downstream-side end portion in said secondary scanning direction of said N dot forming element arrays, wherein said M is a positive integer not more than N and said auxiliary dot forming element arrays and M dot forming element arrays at said downstream-side end portion out of said N dot forming element arrays in case said auxiliary dot forming element array are disposed at said upstream-side end portion, and said auxiliary dot forming element arrays and M dot forming element arrays at said upstream-side end portion out of said N dot forming element arrays in case said auxiliary dot forming element arrays are disposed at downstream-side end portion, form dots intermittently in proper quantities on a same primary scanning line in both said first step and said third step so that dots are not formed so as to be superposed on each other at a same position, or there is not produced a place in which no dots are formed at a position where dots are to be formed.

4. A recording method according to claim 3, wherein said M auxiliary dot forming element arrays and M out of said N dot forming element arrays form dots intermittently at a ratio of one to one.

5. A recording method according to claim 1, wherein when offset α of a secondary scanning distance is defined as a greater value than zero, and also as a value not more than a value obtained such that a value obtained by multiplying said interval d by a square root of two is subtracted from a dot diameter formed by said dot forming element, and a value resulting from said subtraction is divided by a square root of two, said secondary scanning distance in said second step is a distance obtained by adding said offset α to said distance d, and said secondary scanning distance in said fourth step is a distance obtained by subtracting said offset α from said distance $(2N-1)\cdot d$.

6. A recording method according to claim 5, wherein recording data for forming dots in said first step and recording data for forming dots in said third step are same.

7. A recording method according to claim 1, wherein said secondary scanning distance in said second step is a distance obtained by adding said offset α to said distance d, said secondary scanning distance in said fourth step is a distance obtained by subtracting said offset α from said distance $(2N-1)\cdot d$, and said offset a of a secondary scanning distance is a greater value than zero, and also is a value at which no white stripe is generated either between adjacent rasters formed before and after secondary scanning distance (d+a) movement or between rasters formed before and after secondary scanning distance $\{(2N-1)\cdot d-\alpha\}$ movement.

8. A recording method according to claim 1, wherein recording data for forming dots in said first step and recording data for forming dots in said third step are same.

9. A recording method in which, while a recording head, having a dot forming element array in which N dot forming elements are aligned at constant intervals D in a secondary scanning direction which is a direction of conveyance of a recording material, is reciprocally moved in a primary scanning direction perpendicular to said secondary scanning direction, dots are formed on said recording material by said dot forming element array in accordance with recording data, and said recording material is conveyed in said secondary direction and relatively to said recording head, wherein said N is a positive integer and said interval D is a value obtained by multiplying an interval d between dots in recording resolution in said secondary scanning direction by an even number k, and also said even number k and said dot forming element number N are in prime relation to each other, said recording method comprising steps of;

a first step of forming dots on said recording material by said dot forming element array while moving said recording head along a forward-trip or backward-trip path in said primary scanning direction;

a second step of conveying said recording material in said secondary direction and relatively to said recording head by a secondary scanning distance of said interval d between dots;

a third step of forming dots on said recording material by said dot forming element array while moving said recording head along a forward-trip or backward-trip path in said primary scanning direction; and a fourth step of conveying said recording material in said secondary scanning direction and relatively to said recording head by a secondary scanning distance of $(2N-1)\cdot d$;

wherein said first to fourth steps are repeated, thereby performing record.

10. A recording method according to claim 9, wherein two adjacent rasters formed by same dot forming elements before and after said secondary scanning distanced relative conveyance are made one unit, and another raster adjacent said rasters constituting one unit is formed by different dot forming elements from dot forming elements used for forming said unit raster.

11. A recording method according to claim 9, wherein said recording head further has M auxiliary dot forming element arrays aligned at said intervals D in said secondary scanning direction at an upstream-side end portion or downstream-side end portion in said secondary scanning direction of said N dot forming element arrays, wherein said M is a positive integer not more than N and said auxiliary dot forming element arrays and M dot forming element arrays at said downstream-side end portion out of said N dot forming element arrays in case said auxiliary dot forming element array are disposed at said upstream-side end portion, and said auxiliary dot forming element arrays and M dot forming element arrays at said upstream-side end portion out of said N dot forming element arrays in case said auxiliary dot forming element arrays are disposed at downstream-side end portion, form dots intermittently in proper quantities on a same primary scanning line in both said first step and said third step so that dots are not formed so as to be superposed on each other at a same position, or there is not produced a place in which no dots are formed at a position where dots are to be formed.

12. A recording method according to claim 11, wherein said M auxiliary dot forming element arrays and M out of said N dot forming element arrays form dots intermittently at a ratio of one to one.

13. A recording method according to claim 9, wherein when offset α of a secondary scanning distance is defined as a greater value than zero, and also as a value not more than a value obtained such that a value obtained by multiplying said interval d by a square root of two is subtracted from a dot diameter formed by said dot forming element, and a value resulting from said subtraction is divided by a square root of two, said secondary scanning distance in said second step is a distance obtained by adding said offset α to said distance d, and said secondary scanning distance in said fourth step is a distance obtained by subtracting said offset α from said distance (2N−1)·d.

14. A recording method according to claim 13, wherein recording data for forming dots in said first step and recording data for forming dots in said third step are same.

15. A recording method according to claim 9, wherein said secondary scanning distance in said second step is a distance obtained by adding said offset α to said distance d, said secondary scanning distance in said fourth step is a distance obtained by subtracting said offset α from said distance (2N−1)·d, and said offset α of a secondary scanning distance is a greater value than zero, and also is a value at which no white stripe is generated either between adjacent rasters formed before and after secondary scanning distance (d+α) movement or between rasters formed before and after secondary scanning distance {(2N−1)·d−α} movement.

16. A recording method according to claim 9, wherein recording data for forming dots in said first step and recording data for forming dots in said third step are same.

17. A recording apparatus comprising:

a recording head having a dot forming element array in which N, wherein N is a positive integer, dot forming elements are aligned at constant intervals D in a secondary scanning direction which is a direction of conveyance of a recording material;

a head driving means for driving said dot forming elements;

a primary scanning driving means for reciprocally moving said recording head in a primary scanning direction perpendicular to said secondary scanning direction with respect to said recording material;

a secondary scanning driving means for conveying said recording material in said secondary scanning direction and relatively to said recording head; and a control means for controlling said head driving means, said primary scanning driving means, and said secondary scanning driving means to thereby perform recording while said recording head scans a surface of said recording material in said primary scanning direction and said secondary scanning direction;

wherein said interval D is a value obtained by multiplying an interval d between dots in recording resolution in said secondary scanning direction by an even number k, and also said even number k and said dot forming element number N are in prime relation to each other, and that recording is performed by such repetition; and further wherein said control means controls said primary scanning driving means and said head driving means to form dots on said recording material by said dot forming element array while moving said recording head along a forward-trip path in said primary scanning direction, controls said secondary scanning driving means to convey said recording material in said secondary direction and relatively to said recording head by a secondary scanning distance of said interval d between dots, controls said primary scanning driving means and said head driving means to form dots on said recording material by said dot forming element array while moving said recording head along a backward-trip path in said primary scanning direction, and controls said secondary scanning driving means to convey said recording material in said secondary scanning direction and relatively to said recording head by a secondary scanning distance of (2N−1)·d.

18. A recording apparatus according to claim 17, wherein two adjacent rasters formed by same dot forming elements before and after said secondary scanning distance d relative conveyance are made one unit, and another raster adjacent said raster constituting one unit is formed by different dot forming elements from dot forming elements used for forming said unit raster.

19. A recording apparatus according to claim 17, wherein said recording head further has M wherein M is a positive integer not more than N, auxiliary dot forming element arrays aligned at said intervals D in said secondary scanning direction at an upstream-side end portion or downstream-side end portion in said secondary scanning direction of said N dot forming element arrays, and said auxiliary dot forming element arrays and M dot forming element arrays at said downstream-side end portion out of said N dot forming element arrays in case said auxiliary dot forming element arrays are disposed at said upstream-side end portion, and said auxiliary dot forming element arrays and M dot forming element arrays at said upstream-side end portion out of said N dot forming element arrays in case said auxiliary dot forming element arrays are disposed in downstream-side end portion, form dots intermittently in proper quantities on a same primary scanning line by said control means in both said first step and said third step so that dots are not formed so as to be superposed on each other at same positions, or there is not produced a place in which no dots are formed at a position where dots are to be formed.

20. A recording apparatus according to claim 19, wherein said M auxiliary dot forming element arrays and M out of said N dot forming element arrays form dots intermittently at a ratio of one to one.

21. A recording apparatus according to claim 17, wherein when offset α of a secondary scanning distance is defined as a greater value than zero, and also as a value not more than a value obtained such that a value obtained by multiplying said interval d by a square root of two is subtracted from a dot diameter formed by said dot forming elements, and a value resulting from said subtraction is divided by a square root of two, said control means is arranged such that said secondary scanning distance in said second step is a distance obtained by adding said offset α to said distance d, and said secondary scanning distance in said fourth step is a distance obtained by subtracting said offset α from said distance (2N−1)·d.

22. A recording apparatus according to claim 21, wherein said control means is set or can be set such that recording data for forming dots in said first step and recording data for forming dots in said third step are same.

23. A recording apparatus according to claim 17, wherein said secondary scanning distance in said second step is a distance obtained by adding said offset α to said distance said secondary scanning distance in said fourth step is a distance obtained by subtracting said offset α from said distance (2N−1)·d, and said offset a of α secondary scanning distance is a greater value than zero, and also is a value at which no white stripe is generated either between adjacent rasters formed before and after secondary scanning distance (d+α) movement or between rasters formed before and after secondary scanning distance {(2N−1)·d−α} movement.

24. A recording apparatus according to claim 17, wherein said control means is set or can be set such that recording data for forming dots in said first step and recording data for forming dots in said third step are same.

25. A recording apparatus comprising:

a recording head having a dot forming element array in which N, wherein N is a positive integer, dot forming elements are aligned at constant intervals D in a secondary scanning direction which is a direction of conveyance of a recording material;

a head driving means for driving said dot forming elements;

a primary scanning driving means for reciprocally moving said recording head in a primary scanning direction perpendicular to said secondary scanning direction with respect to said recording material, a secondary scanning driving means for conveying said recording material in said secondary scanning direction and relatively to said recording head;

a control means for controlling said head driving means, said primary scanning driving means, and said secondary scanning driving means to thereby perform recording while said recording head scans a surface of said recording material in said primary scanning direction and said secondary scanning direction, wherein said interval D is a value obtained by multiplying an interval d between dots in recording resolution in said secondary scanning direction by an even number k, and also said even number k and said dot forming element number N are in prime relation to each other, and that recording is performed by such repetition; and further wherein said control means controls said primary scanning driving means and said head driving means to form dots on said recording material by said dot forming element array while moving said recording head along a forward-trip or backward-trip path in said primary scanning direction, controls said secondary scanning driving means to convey said recording material in said secondary direction and relatively to said recording head by a secondary scanning distance of said interval d between dots, controls said primary scanning driving means and said head driving means to form dots on said recording material by said dot forming element array while moving said recording head along a forward-trip or backward-trip path in said primary scanning direction, and controls said secondary scanning driving means to convey said recording material in said secondary scanning direction and relatively to said recording head by a secondary scanning distance of (2N−1)·d.

26. A recording apparatus according to claim 25, wherein two adjacent rasters formed by same dot forming elements before and after said secondary scanning distance d relative conveyance are made one unit, and another raster adjacent said raster constituting one unit is formed by different dot forming elements from dot forming elements used for forming said unit raster.

27. A recording apparatus according to claim 25, wherein said recording head further has M, wherein M is a positive integer not more than N, auxiliary dot forming element arrays aligned at said intervals D in said secondary scanning direction at an upstream-side end portion or downstream-side end portion in said secondary scanning direction of said N dot forming element arrays, and said auxiliary dot forming element arrays and M dot forming element arrays at said downstream-side end portion out of said N dot forming element arrays in case said auxiliary dot forming element arrays are disposed at said upstream-side end portion, and said auxiliary dot forming element arrays and M dot forming element arrays at said upstream-side end portion out of said N dot forming element arrays in case said auxiliary dot forming element arrays are disposed in downstream-side end portion, form dots intermittently in proper quantities on a same primary scanning line by said control means in both said first step and said third step so that dots are not formed so as to be superposed on each other at same positions, or there is not produced a place in which no dots are formed at a position where dots are to be formed.

28. A recording apparatus according to claim 27, wherein said M auxiliary dot forming element arrays and M out of said N dot forming element arrays form dots intermittently at a ratio of one to one.

29. A recording apparatus according to claim 25, wherein when offset α of a secondary scanning distance is defined as a greater value than zero, and also as a value not more than a value obtained such that a value obtained by multiplying said interval d by a square root of two is subtracted from a dot diameter formed by said dot forming elements, and a value resulting from said subtraction is divided by a square root of two, said control means is arranged such that said secondary scanning distance in said second step is a distance obtained by adding said offset α to said distance d, and said secondary scanning distance in said fourth step is a distance obtained by subtracting said offset α from said distance (2N−1)·d.

30. A recording apparatus according to claim 29, wherein said control means is set or can be set such that recording data for forming dots in said first step and recording data for forming dots in said third step are same.

31. A recording apparatus according to claim 25, wherein said secondary scanning distance in said second step is a distance obtained by adding said offset α to said distance d, said secondary scanning distance in said fourth step is a distance obtained by subtracting said offset α from said distance (2N−1)·d, and said offset α of a secondary scanning distance is a greater value than zero, and also is a value at which no white stripe is generated either between adjacent rasters formed before and after secondary scanning distance (d+α) movement or between rasters formed before and after secondary scanning distance {(2N−1)·d−α} movement.

32. A recording apparatus according to claim 25, wherein said control means is set or can be set such that recording data for forming dots in said first step and recording data for forming dots in said third step are same.

* * * * *